United States Patent [19]

Hiles

[11] 4,346,205
[45] Aug. 24, 1982

[54] ENERGY ABSORBING ELASTOMERS AND COMPOSITES

[75] Inventor: Maurice A. F. Hiles, Welwyn, England

[73] Assignee: National Research Development Corporation, London, England

[21] Appl. No.: 150,951

[22] Filed: May 19, 1980

Related U.S. Application Data

[60] Continuation of Ser. No. 38,307, May 11, 1979, abandoned, which is a continuation of Ser. No. 904,920, May 3, 1978, abandoned, which is a division of Ser. No. 736,936, Oct. 29, 1976, Pat. No. 4,101,704, which is a continuation-in-part of Ser. No. 681,528, Apr. 29, 1976, abandoned.

[30] Foreign Application Priority Data

Jul. 23, 1976 [GB] United Kingdom ............... 30881/76

[51] Int. Cl.³ ...................... C08G 18/48; C08G 18/18
[52] U.S. Cl. ........................................ 528/53; 428/71;
428/319.3; 428/423.3; 428/424.2; 521/51;
521/110; 521/112; 521/174; 528/44; 528/76;
528/77; 528/906
[58] Field of Search ................. 521/110, 51, 112, 174;
528/48, 53, 76, 77, 906

[56] References Cited

U.S. PATENT DOCUMENTS

| 3,049,515 | 8/1962 | Damusis | 528/77 |
| 3,061,556 | 10/1962 | Gemeinhardt | 521/174 |
| 3,067,149 | 12/1962 | Dombrow et al. | 521/174 |
| 3,072,582 | 1/1963 | Frost | 521/174 |
| 3,905,925 | 9/1975 | Vervloet | 260/2.5 BD |
| 4,057,595 | 11/1977 | Rauner et al. | 528/906 |

FOREIGN PATENT DOCUMENTS

| 1217385 | 5/1960 | France . |
| 879373 | 12/1961 | United Kingdom . |
| 1564195 | 4/1980 | United Kingdom . |

Primary Examiner—H. S. Cockeram
Attorney, Agent, or Firm—Finnegan, Henderson, Farabow, Garrett & Dunner

[57] ABSTRACT

A novel elastomer having a very low compression set and a very slow recovery from compression comprises a flexible polyurethane of essentially linear structure containing unsatisfied hydroxyl groups, and is the reaction product of substantially linear polyols having hydroxyl end groups and an average molecular weight in the range 600 to 1200, with an aromatic isocyanate in less than stoichiometric amount. This elastomer can be used as one layer of an energy-absorbing material, in combination with a more difficultly compressible layer comprising a tough flexible polymeric matrix having a plurality of rigid hollow bodies embedded therein.

24 Claims, 1 Drawing Figure

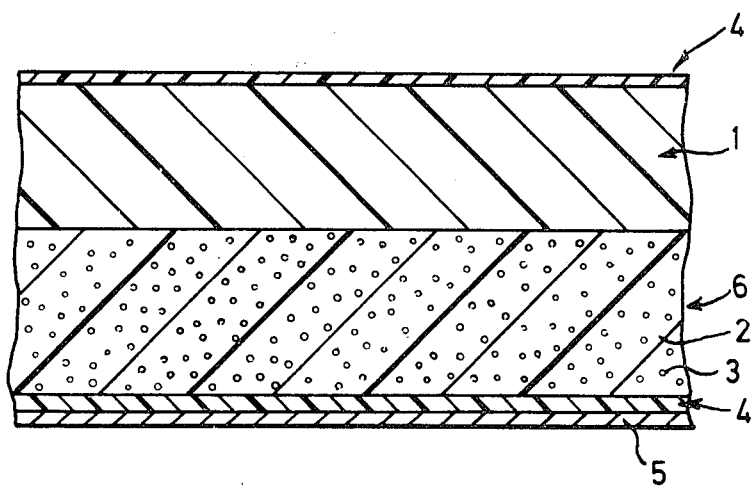

ENERGY ABSORBING ELASTOMERS AND COMPOSITES

This application is a continuation of application Ser. No. 038,307, filed May 11, 1979 now abandoned which is a continuation of application Ser. No. 904,920, filed May 3, 1978, now abandoned, which is a division of application Ser. No. 736,936, filed Oct. 29, 1976, now U.S. Pat. No. 4,101,704, issued July 18, 1978, which is a continuation-in-part of my Application Ser. No. 681,528 filed Apr. 29, 1976, now abandoned.

This invention relates to energy absorbing materials, and more particularly but not exclusively to energy absorbing materials suitable for use in automobile bumpers and other devices intended to provide protection against damage due to impact, shock or collision, and for use in the absorption of sound.

It has been proposed to manufacture automobile bumpers from micro-cellular urethane elastomers by moulding techniques. These have a number of advantages over conventional metal bumpers, in particular they can withstand multiple impacts without functional or visual damage and are much lighter in weight. However, bumpers formed from micro-cellular urethane elastomers only provide useful protection against impacts at very low speeds, at the very most up to about 10 miles an hour.

An object of the present invention is to provide an energy absorbing material which can provide an improved protection against damage due to impact, shock or collision.

A further object of the invention is to provide a solid energy-absorbing material with quasi-liquid properties.

A further object is to provide a solid elastomer having very slow recovery from deformation due to an applied force, for use in energy absorption.

The present invention in one aspect provides an energy absorbing material which comprises an elastomeric layer of polymeric material having a low compression set and a delayed recovery from compression, in combination with a more difficultly compressible layer comprising a tough flexible polymeric matrix having a plurality of rigid hollow bodies embedded therein, the arrangement being such that under the action of deforming forces deformation of the layers takes place sequentially.

Preferably the energy absorbing material is encased in an outer skin which is resistant to abrasion and weathering.

The invention in another aspect provides an elastomer comprising a flexible polyurethane having a compression set less than 5%, an elongation at break of 500 to 1200%, and a recovery which is delayed after compression by at least 0.7 sec, and having a low branch molecular weight and a very low degree of cross-linking.

The invention in another aspect provides an elastomer comprising a flexible polyurethane of essentially linear structure containing unsatisfied hydroxyl groups, and having a compression set less than 15%, an elongation at break of at least 500%, and a recovery which is delayed after compression by at least 0.7 sec.

The invention further provides a method of making a polyurethane elastomer having a low compression set and a delayed recovery from compression, which method comprises reacting a slightly branched polyol of low molecular weight with a relatively small amount of an aromatic isocyanate.

The invention further provides a method of making a polyurethane elastomer having a low compression set and a delayed recovery from compression, which method comprises reacting substantially linear polyols having hydroxyl end groups and an average molecular weight in the range 600 to 1200, with an aromatic isocyanate in less than stoichiometric amount whereby the resulting elastomer contains unsatisfied OH groups.

The invention further provides a method of making a foam elastomer comprising admixing a polyurethane elastomer with substantially linear polyols having an average molecular weight in the range 600 to 1200 and an aromatic isocyanate in less than stoichiometric amount with respect to the polyol, and a foaming agent.

In the following description of the invention, wherein further objects and advantages thereof are revealed, reference will be made to the accompanying drawing, which shows a schematic cross-section through an energy-absorbing material embodying the invention.

The drawing shows (not to scale) a section through an energy-absorbing multi-layer material applicable to an automobile bumper. The material essentially comprises a layer 1 of elastomeric non-cellular polyurethane having a low compression set (less than 5%) and a delayed recovery from compression (longer than 0.7 sec.) bonded to a less compressible layer 2 comprising a tough flexible polyurethane matrix 6 in which a multiplicity of rigid hollow bodies 3 are embedded. The layers 1, 2 are encased in an abrasion and weather-resistant skin 4 and the material is mounted on a metal backing plate 5. In an impact, the elastomeric layer 1 will deform first and this layer will absorb all low-energy impacts. Heavier impacts deform the less compressible layer 2 and, if heavy enough, fracture the hollow bodies 3.

Further particulars of the constituents of the energy-absorbing material are set forth below. Although the invention is particularly described with reference to the use of the new energy absorbing materials in the production of automobile bumpers, it is to be understood that the invention is not limited thereto, and for example the new energy absorbing materials may find application as shock absorbers and in the damping of machinery.

Although the invention is not restricted to any particular theory, it is believed that automobile bumpers are subjected to two main types of serious damage. These are:

(1) Low speed impacts caused by parking errors, mainly involving collision with stationary objects, and
(2) High speed impacts in road accidents.

The elastomeric layer 1 is provided to reduce damage due to low speed impacts. In order that the bumper should appear substantially unaltered after such an impact the elastomeric layer should have a low compression set, for example less than 10%, preferably less than 5%, and most preferably less than 1%. In this specification the compression set is defined as the percentage lack of recovery after compression. As a rough approximation, the average impact time of an automobile collision is of the order of 0.7 secs., and for use in a bumper the recovery delay of the elastomeric layer after removal of applied compression force must be greater than this impact time. Polymeric materials having a recovery time of at least 2 secs. are desirable, and a preferred recovery time is between 2 and 10 secs. Preferably the hysteresis pattern of the polymeric material should show an initial slow rate of recovery. A suitable polymeric material for the elastomer is a flexible noncellular polyurethane of essentially linear structure containing unsatisfied hydroxyl groups, having a compression set less than 15% preferably less than 5%, an elongation at break of at least 500%, and a recovery which is delayed after compression by at least 0.7 sec. Such polyurethane elastomers are novel and accordingly this invention also provides, as a new composition of matter, an elastomeric polyurethane having the aforesaid structure and properties.

The elastomer preferably has a hardness, on the Shore 00 scale, not exceeding 50, preferably not exceeding 20, preferably in the range 0 to 10.

Typical polyurethane elastomers of the invention have an elongation at break preferably exceeding 600%, e.g. about 800%; a tear strength of 5 to 20 lbs./linear inch, particularly 5 to 10 lbs./linear inch; and a tensile strength up to 50 lbs./square inch. The rather low tear strength and tensile strength of such materials can be counteracted by incorporating fibrous material.

In addition to the above properties, the elastomer should also be stable at temperatures of from $-40°$ C. to $+100°$ C.

Suitable polyurethane polymers for the elastomer are those having a low branch molecular weight and a very low degree of cross-linking. Such a polyurethane may be produced, for example, by reacting a low molecular weight linear or slightly branched polyol with a relatively small amount of an aromatic isocyanate e.g. 4,4′-diphenylmethane diisocyanate toluene diisocyanate or triphenyl methanetriisocyanate. The aromatic isocyanate may if desired be mixed with a diluent, for example methylene chloride. The polyol should have a molecular weight of from 600 to 1200, preferably 700 to 900, and may be prepared by condensation of a polyglycol, in particular a polyalkylene glycol such as polyethylene glycol or polypropylene glycol, to a molecular weight of between 600 and 1200. The polyol has hydroxyl end groups, preferably only two OH groups/molecule, and is essentially linear with a minimum of branching. The polyol also may be prepared by heating a suitable polyester in an autoclave under pressure at a temperature of from about 160° to 250° C. for a period of up to about 8 hours. Very good results have been obtained using a polyol designated PM 515X or PM 735X and supplied by Bostik Limited (a blend of polyols of different molecular weights, the blend containing approximately 30 parts by weight of higher average molecular weight, i.e., above 1500, and approximately 10 parts by weight of lower average molecular weight, i.e., below 500).

The aromatic isocyanate and the polyol are reacted together using standard urethane technology, in the complete absence of water and using a suitable catalyst. Triethylene diamine is the preferred catalyst but other tertiary amines are satisfactory. The aromatic isocyanate is present in less than the stoichiometrical quantity needed to react with the hydroxyl groups, so that not all of the hydroxyl groups are satisfied. The resulting polymer is believed to have foreshortened chains because the polymerization cannot proceed to completion, with a minimum of chain branching. The resulting solid polymer is readily deformed by an applied force and is slow to recover, although in the absence of such a force it takes up a defined shape and volume.

It is believed that, to achieve the desired physical properties of the material, the polyurethane elastomer should contain 0.002 to 0.004 gram of unsatisfied OH groups per gram of elastomer, preferably 0.0023 to 0.0034 gm OH/gram. To achieve this the mole ratio of OH to NCO in the reactants should be in the range 5:1 to 1:22:1 corresponding to approximately 80% to 55% unsatisfied OH groups in the product.

Certain properties of the elastomer, in particular tensile strength, tear strength, elongation and compression set, can be improved by carrying out the reaction under superatmospheric pressure, for example in the range 50 to 150 psi. This is accompanied by a small increase in hardness.

The molecular weight of the polyol is important with respect to the energy absorbing properties of the material since in general below a molecular weight of 600 the polymer material will suffer permanent deformation and above 1200 the polymer will recover too quickly from an applied force (i.e. with a delay less than 0.7 sec.). Very good results have been obtained using a polyol designated PM 515X or PM 735X and supplied by Bostik Limited (a blend of polyols of different molecular weights, the blend containing approximately 30 parts by weight of higher average molecular weight, i.e., above 1500, and approximately 10 parts by weight of lower average molecular weight, i.e., below 500).

Fillers may be added to stiffen the material. Hydrocarbons may be added as a diluent during polymerization by up to 10% by weight of the polyol to reduce the surface tack of the finished polymer.

It has been found that surface tack can be reduced and abrasion resistance increased by the incorporation of a small amount of a silicone polycarbinol, in particular a polypropylene oxide-siloxane copolymer. Normally such additives are present at over 2% by weight of the polyol, but such amounts are ineffective in the elastomer of the invention; instead, amounts less than 2%, preferably 0.5% to 1%, are effective in the elastomer of the invention and improve both surface tack and abrasion resistance.

Examples of specific elastomers of the invention and their manufacture will now be given.

Table 1 lists four different reaction mixtures A to D each of which was polymerized at atmospheric pressure and also at 80 psia so that in all eight different products were obtained. The physical properties of each of these products are listed in Table 1.

TABLE 1

| | | Units | SAMPLE A Atmospheric pressure | 80 psi | SAMPLE B Atmospheric Pressure | 80 psi | SAMPLE C Atmospheric Pressure | 80 psi | SAMPLE D Atmospheric pressure | 80 psi |
| --- | --- | --- | --- | --- | --- | --- | --- | --- | --- | --- |
| Chemical Composition | Polyol PM 735X | ppw | 21.25 | | 20.75 | | 20.50 | | 20.25 | |
| | Polypropylene oxide - Siloxane copolymer | ppw | 0.16 | | 0.14 | | 0.13 | | 0.12 | |
| | 4,4′-Diphenylmethane diisocyanate (86% pure) | ppw | 1.00 | | 1.00 | | 1.00 | | 1.00 | |
| Physical | Hardness (40 hrs) | Shore′00′ | 8 | 10 | 18 | 20 | 35 | 38 | 40 | 42 |

TABLE 1-continued

|  |  | Units | SAMPLE A Atmospheric pressure | 80 psi | SAMPLE B Atmospheric Pressure | 80 psi | SAMPLE C Atmospheric Pressure | 80 psi | SAMPLE D Atmospheric pressure | 80 psi |
|---|---|---|---|---|---|---|---|---|---|---|
| Properties | Density | gm/cc | 1.34 | 1.34 | 1.34 | 1.34 | 1.34 | 1.34 | 1.34 | 1.34 |
|  | Ultimate tensile strength | psi | 14 | 18 | 18 | 21 | 24 | 30 | 40 | 45 |
|  | Elongation at break | % | 800 | 900 | 720 | 840 | 680 | 700 | 640 | 650 |
|  | Tear Strength | lb/linear" | 5.0 | 5.9 | 5.5 | 6.4 | 6.3 | 6.9 | 6.8 | 7.6 |
|  | Compression set at +22° C. | % | 4 | 0 | 13 | 0 | 13 | 1 | 13 | 1 |
|  | Compression at −40° C. | % | 5 | 0 | 14 | 0 | 14 | 1 | 14 | 2 |
|  | Impact (.5 lb ball at 6ft) | — | no crack | no crack | no crack | no crack | no crack | no crack | no crack | no crack |
|  | Complex modulus phase shift | °C./decade |  |  | 20 | 22 |  |  |  |  |
|  | Recovery delay | secs | 2.0 | 2.0 | 1.5 | 1.5 | 1.0 | 1.0 | 1.0 | 1.0 |

Each mixture consisted of the same linear polyol Bostik PM 735X, of molecular weight 700–900 (determined by measurement of the hydroxyl number), based on polypropylene glycol. It is a blend of about 75% by weight of a polyol having an average molecular weight greater than 1500 and about 25% by weight of a polyol having an average molecular weight less than 500. This polyol contained 0.7% to 2% triethylene diamine as catalyst. It was placed in a glass vessel with the 4,4'-diphenylmethane diisocyanate and the polypropylene oxide-siloxane copolymer, at 20° C., and mixture stirred for 20 sec. Polymerization took 1 to 20 min. according to the proportion of catalyst present. With 2% catalyst there was a noticeable viscosity increase after 60 sec., gelation occurred in 4 min. and the material was solid after 8 minutes, whereafter it could be removed from the vessel or mould. Heat was evolved, raising the temperature to as much as 80° C.

The quantities of the constituents are given in parts by weight (ppw). It will be seen that a reduction in the proportion of polyol leads to an increase in hardness, tensile strength and tear strength but reduces the elongation and recovery delay time after compression, and increases the compression set. Polymerization under pressure also increases hardness and strength but increases the elongation and reduces compression set.

The maintenance of low compression set at low temperatures is to be noted. Flexibility is also maintained: a sample 10" by 0.5" by 0.25" was kept at −40° C. for 24 hours; it could then be wrapped round a mandrel of 3" diameter without cracking. The material also withstands the impact test without cracking, at −40° C. and 75° C. The softening temperature depends somewhat on the formulation and polymerization conditions but is typically in the range 90° C. and 120° C.

The recovery delay was determined from dynamic measurements of the complex modulus phase shift, showing substantial recovery after 2 to 3 sec. (Sample A) and complete recovery after 100 sec.

The material is chemically and dimensionally stable, with good resistance to water, ozone, oil, petrol and ethylene glycol.

The impact-absorbing properties of the elastomer were investigated by the Lüpke (BS 903) pendulum rebound test. Table 2 compares a specimen (LCS) of the elastomer of the invention (layer 1 of the material shown in the drawing). It can be seen that this elastomer is "dead".

TABLE 2

| LUPKE PENDULUM at 20° C. | | |
|---|---|---|
| MATERIAL | HARDNESS (IRHD) | REBOUND RESILIENCE % |
| Natural rubber | 52 | 69 |
| Butyl | 45 | 13 |
| SBR (Styrene butadiene rubber) | 53 | 34 |
| Nitrile | 57 | 32 |
| EPDM (Ethylene propylene elastomer) | 53 | 48 |
| Neoprene | 62 | 57 |
| Silicone | 53 | 42 |
| "Viton" fluorinated rubber | 72 | 5 |
| LOS | less than 1 | 0 |

The present elastomer has excellent sound attenuation and vibration damping and is useful as a sound-deadening material e.g. in vehicles. Its sound attenuation is much greater than that of materials commonly used hitherto, as is shown by the comparative Table 3.

TABLE 3

| Material | Thickness (mm) | Output, decibels |
|---|---|---|
| Bestobell "Acoustolan" | 62.5 | 80 |
| Neoprene foam | 12.5 | 91 |
| Neoprene rubber | 10 | 81 |
| Monothane polyurethane | 35 | 66 |
| Monothane polyurethane | 10 | 76 |
| Nitrile rubber | 15 | 69 |
| Nitrile rubber | 10 | 72 |
| LCS Sample B | 12.5 | 56 |

The foregoing description and in particular the numerical values of physical properties relate to the solid elastomer. However the elastomer can readily be produced in foam form e.g. by the addition of water and 4,4'-diphenylmethane diisocyanate to react with the water, for example in the proportions 6 ppw water, 8 ppw 4,4'-diphenylmethane diisocyanate, 100 ppw polyol. The water preferably has a pH greater than 7. A 6-fold volume increase can be attained. The foam produces greater rebound than the solid material, but much less than conventional polyurethane foam, as shown in Table 4 below:

TABLE 4

| Lupke pendulum test, sample thickness 12.5 mm | |
|---|---|
| Material | % Rebound resilience |
| Foam LCS (relative density 0.33) | 12 |
| Neoprene foam | 44 |
| Natural rubber foam | 32 |
| Polyurethane foam | 38 |

The more difficultly compressible layer 2 is provided in order to absorb energy generated by impact at higher speeds. It comprises a tough flexible polymeric matrix 6 having a plurality of rigid hollow bodies 3 embedded therein. The physical properties of the polymer matrix 5 are preferably as follows:

| Tensile strength: | 500 to 3500 lbs. per square inch |
|---|---|
| Elongation to break: | 200 to 600% |
| Tear strength: | 120 to 150 lbs. per linear inch |

Preferably the polymeric matrix should be stable in the range of $-40°$ C. to $+100°$ C.

The polymer matrix 2 is preferably also formed from a polyurethane polymer, although other polymers may also be used, for example a rubber modified polystyrene, a polyolefin, a flexible polyester, an epoxy resin or polyvinyl chloride. Where the polymer matrix is formed from a polyurethane polymer, this is preferably a polyurethane produced by reaction of a polyester polyol having, for example, a molecular weight of 500 to 1000 with an aromatic isocyanate such as 4,4'-diphenylmethane diisocyanate. Suitable polyurethanes are sold by Bostik Limited and designated GC148 and GC 155.

It is believed that under impact conditions, the energy absorbing properties of the difficultly compressible layer 2 are due primarily to fracture of the rigid hollow bodies 3. A number of very hard materials can be produced in the form of hollow bodies of generally spherical shape, including phenolic resins, glass, silica and carbon. Preferably the average diameter of the hollow bodies is within the range of from 50 to 400 microns. The optimum quantity of rigid hollow bodies in the difficulty compressible layer will depend to some extent upon the application, but will usually be in the range of from 10 to 60% by weight based on the total weight of the difficulty compressible layer.

In addition to the more serious damage, bumpers are also subject to minor scuffs, scratches, and abrasions, and against these the impact absorbing material is preferably provided with a tough outer skin 4 which, in addition to its abrasion resistance, should also be resistant to degradation by environmental agencies such as ultraviolet light, water road salts, ethylene glycol, and automotive fuels. The outer skin should also be stable at temperatures from $-40°$ C. to $+100°$ C. The outer skin is preferably formed from a polymer having the following physical properties:

| Tensile strength: | 500 to 1500 lbs. per square inch |
|---|---|
| Elongation to break: | 200 to 800% |
| Tear strength: | 95 to 150 lbs. per linear inch |
| Hardness: | 50 to 80 (Shore A scale) |
| Abrasion resistance: | 0.2 cc per 1000 revs. (measured on a DuPont wheel) |
| Compression set: | 12 to 25% |

In addition to the above properties, the outer skin should perferably be resilient and have a good recovery.

Suitable polymers for use in the production of the outer skin include polyvinyl chloride, synthetic and natural rubbers, polyolefins, and polydienes although preferably the outer skin is also formed from a polyurethane polymer. The preferred polyurethane polymers are those prepared by reaction of a polyester polyol with an aromatic isocyanate such as 4,4'-diphenylmethane diisocyanate. Polyester polyols which have been found to give good results are those manufactured and sold by Bostik Limited under the trade names PM 117X and PM 260X. These are believed to be polyoxyalkyleneglycols having a molecular weight of 1100 to 1300 and a hydroxyl number of from 120 to 140.

Preferably, for an automobile bumper, the energy absorbing material is mounted upon a rigid e.g. metal backing plate 5.

Bumpers according to the present invention may be made by conventional moulding or casting procedures. The relative thicknesses of the energy absorbing layers are dependent on the use. In a bumper, by way of example, the elastomeric layer 1 may be from 3 to 6 inches in thickness, and the more difficultly compressible layer 2 from 3 to 6 inches in thickness. Where an outer skin 4 is present this is preferably of from 1/16 to ½ inch in thickness. Preferably the energy absorbing material is arranged such that the more difficultly compressible layer 2 is adjacent to the backing plate 5, although this is not essential. Skin 4 can be omitted between the energy-absorbing material and the backing plate 5.

Impact absorbing materials according to the invention can afford excellent protection against impact for a wide variety of applications. In addition, the materials of the individual elastomeric and more difficultly compressible layers may be used independently in appropriate energy absorbing situations with excellent results, for example the elastomeric polyurethane polymers of the invention may find application in sports wear such as shin pads and athletic shoes, crash helmets, orthopaedic beds and shock absorber inserts, and in sound absorption.

It has also been found that the polyurethane polymer of the invention can be used to modify conventional solid polyurethane elastomers, for example those having a molecular weight of between 500 to 4000, in such a way that the coefficient of restitution of the elastomer is decreased. Such a combination, when foamed in the usual way, can be used to make a ball suitable for sports and games, in particular the game of squash rackets. A ball, so made, is at least as good as and in many ways superior to a conventional hollow moulded rubber ball.

In order to achieve the correct bounce characteristic, which differs with each grade of ball, it is necessary to vary the amount of each component of the material. For example, as little as 25% of the polyol described may be used or as much as 75%. To achieve other characteristics it may be necessary to add from 5% to 95%.

For example, 25 parts by weight of the described polyol are added to 63 parts of a conventional polyurethane elastomer having a molecular weight of 2200, such as Bostik 2305, in a suitable glass vessel. 1 part of water is added and the whole throughly mixed by hand for 20 seconds. To this is added 11 parts of 4,4'-diphenylmethane diisocyanate and the mixture stirred for 10 seconds. The mixture is then poured into one half of a suitable mold (at 18° C.) and the other half placed on top. The mixture is allowed to foam and fill the cavity. After 2 minutes the moulded foam ball may be removed from the cavity. It is found that such a ball has the bounce characteristics of a conventional squash ball described as white spot grade, and satisfies the official requirements namely a diameter of 1 7/16 to 1⅝ (39.65 to 41.28 mm) and weight of 13.1 to 13.8 drams (23.29 to 24.66 gm).

I claim:

1. An elastomer comprising a flexible polyurethane of essentially linear structure containing unsatisfied hydroxyl groups, and having a compression set less than 15%, an elongation at break of at least 500%, and a recovery which is delayed after compression by at least 0.7 sec, said elastomer comprising the reaction product of substantially linear polyols based on polyalkylene glycol and having an average molecular weight in the range of 600 to 1200, and an aromatic diisocyanate.

2. An elastomer as claimed in claim 1 having a compression set at room temperature less than 5%.

3. An elastomer as claimed in claim 1 having a Shore (0 0) hardness in the range 0 to 50.

4. An elastomer as claimed in claim 3 having a hardness in the range 0 to 20.

5. An elastomer as claimed in claim 1, having a recovery delay of at least 2 secs.

6. An elastomer as claimed in claim 1, wherein the diisocyanate is 4,4'-diphenylmethane diisocyanate.

7. An elastomer as claimed in claim 1 containing 0.002 to 0.004 gram of unsatisfied OH groups per gram.

8. An elastomer as claimed in claim 7 containing 0.0023 to 0.0034 gram of unsatisfied OH groups per gram.

9. An elastomer as claimed in claim 1 containing an anti-tack agent.

10. An elastomer as claimed in claim 9 wherein said agent is a silicone polycarbinol.

11. An elastomer as claimed in claim 10 wherein said agent is a polypropylene oxide-siloxane copolymer.

12. An elastomer as claimed in claim 10 in which the proportion of said agent is not more than 2% by weight.

13. A method of making a flexible polyurethane elastomer of essentially linear structure containing unsatisfied hydroxyl groups and having a compression set less than 15%, an elongation at break of at least 500%, and a recovery which is delayed after compression by at least 0.7 sec, which method comprises reacting substantially linear polyols based on polyalkylene glycol and having an average molecular weight in the range 600 to 1200 with an aromatic diisocyanate which is in less than stoichiometric amount.

14. An elastomer as claimed in claim 1 wherein said substantially linear polyols based on polyalkylene glycol have an average molecular weight in the range of 700 to 900.

15. An elastomer as claimed in claim 1 wherein said substantially linear polyols based on polyalkylene glycol are a blend of a major amount of polyol having an average molecular weight above 1500 and a minor amount of polyol having an average molecular weight below 500.

16. An elastomer as claimed in claim 1 wherein said substantially linear polyols based on polyalkylene glycol are a blend of about 75 percent by weight of polyol having an average molecular weight above 1500 and about 25 percent by weight of polyol having an average molecular weight below 500.

17. A method as claimed in claim 13 wherein said substantially linear polyols based on polyalkylene glycol have an average molecular weight in the range of 700 to 900.

18. A method as claimed in claim 13 wherein the reaction is catalyzed by a tertiary amine.

19. A method as claimed in claim 13 further comprising admixing a silicone polycarbinol in an amount not exceeding 2% by weight of the polyol.

20. A method as claimed in claim 19 wherein the amount of silicone polycarbinol is 0.5 to 1% by weight of the polyol.

21. A method as claimed in claim 13 wherein the reaction is carried out under superatmospheric pressure.

22. A method as claimed in claim 21 wherein the pressure is in the range 50 to 150 p.s.i.

23. A method as claimed in claim 13 wherein said substantially linear polyols based on polyalkylene glycol are a blend of a major amount of polyol having an average molecular weight above 1500 and a minor amount of polyol having an average molecular weight below 500.

24. A method as claimed in claim 13 wherein said substantially linear polyols based on polyalkylene glycol are a blend of about 75 percent by weight of polyol having an average molecular weight above 1500 and about 25 percent by weight of polyol having an average molecular weight below 500.

* * * * *